US009991587B1

(12) United States Patent
Freedman et al.

(10) Patent No.: US 9,991,587 B1
(45) Date of Patent: *Jun. 5, 2018

(54) SATELLITE BEAMFORMING

(71) Applicant: RKF Engineering Solutions, LLC, Washington, DC (US)

(72) Inventors: Jeffrey Freedman, Laurel, MD (US); Arnold Berman, Washington, DC (US); Michael Mandell, Farmington Hills, MI (US); Erik Halvorson, Vienna, VA (US); Scott Conrad Markley, Washington, DC (US)

(73) Assignee: RFK Engineering Solutions, LLC, Bethesda, MD (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/269,526

(22) Filed: Sep. 19, 2016

Related U.S. Application Data

(63) Continuation of application No. 14/797,296, filed on Jul. 13, 2015, now Pat. No. 9,450,666, which is a continuation of application No. 13/762,784, filed on Feb. 8, 2013, now Pat. No. 9,083,426.

(60) Provisional application No. 61/596,545, filed on Feb. 8, 2012.

(51) Int. Cl.
*H01Q 1/28* (2006.01)
*H04B 7/185* (2006.01)
*H01Q 15/16* (2006.01)
*H01Q 3/26* (2006.01)

(52) U.S. Cl.
CPC ........... *H01Q 1/288* (2013.01); *H01Q 3/2605* (2013.01); *H01Q 15/16* (2013.01); *H04B 7/1851* (2013.01)

(58) Field of Classification Search
CPC ............................ H04B 7/18515; G01S 19/00
USPC ... 455/427, 3.02, 3.01, 429, 430, 12.1, 13.2, 455/13.3, 67.11, 428
See application file for complete search history.

(56) References Cited

U.S. PATENT DOCUMENTS

| 5,572,219 | A | 11/1996 | Silverstein | |
|---|---|---|---|---|
| 5,594,452 | A | 1/1997 | Webber | |
| 6,597,730 | B1 | 7/2003 | Bader | |
| 6,697,619 | B1 * | 2/2004 | Hogberg | H04B 7/2041 |
| | | | | 455/12.1 |
| 8,229,017 | B1 * | 7/2012 | Lee | H04B 7/0665 |
| | | | | 342/432 |

(Continued)

OTHER PUBLICATIONS

Office Action (Quayle) issued in U.S. Appl. No. 13/762,784 dated Dec. 31, 2014, 7 pages.

(Continued)

*Primary Examiner* — John J Lee
(74) *Attorney, Agent, or Firm* — Fish & Richardson P.C.

(57) ABSTRACT

Beamforming in a satellite communications network includes determining a first delay imparted to signals redirected by a first reflecting dish in a satellite, the first delay being caused by motion of the first reflecting dish relative to the satellite. A second delay imparted to signals redirected by a second reflecting dish in the satellite is determined, the second delay being caused by motion of the second reflecting dish relative to the satellite. Calculating, using the determined first and second delays, beamforming coefficients that enable the generation of a single beam by combining a group of signals that includes a first signal redirected by the first reflecting dish and a second signal redirected by the second reflecting dish.

49 Claims, 7 Drawing Sheets

(56) References Cited

U.S. PATENT DOCUMENTS

| | | | |
|---|---|---|---|
| 8,604,975 B2 | 12/2013 | Saha | |
| 2003/0043071 A1* | 3/2003 | Lilly | H01Q 3/22 |
| | | | 342/368 |
| 2008/0051080 A1* | 2/2008 | Walker | H04B 7/2041 |
| | | | 455/427 |
| 2011/0050489 A1 | 3/2011 | Maenpa | |

OTHER PUBLICATIONS

Notice of Allowance issued in U.S. Appl. No. 13/762,784 dated Mar. 13, 2015, 7 pages.
Office Action issued in U.S. Appl. No. 14/797,296 dated Feb. 25, 2016, 9 pages.
Notice of Allowance issued in U.S. Appl. No. 14/797,296 dated May 20, 2016, 8 pages.

\* cited by examiner

US 9,991,587 B1

SATELLITE BEAMFORMING

CROSS-REFERENCE TO RELATED APPLICATIONS

This application is a continuation of U.S. patent application Ser. No. 14/797,296, filed on Jul. 13, 2015, which is a continuation of U.S. patent application Ser. No. 13/762,784, filed on Feb. 8, 2013, now U.S. Pat. No. 9,083,426, issued Jul. 14, 2015, which claims the benefit of U.S. Provisional Application No. 61/596,545, filed on Feb. 8, 2012, which are incorporated herein by reference in their entirety for all purposes.

TECHNICAL FIELD

The following disclosure relates to satellite communications systems, and one particular implementation relates to a satellite communications system that can create and reconfigure multiple beam coverage shapes and areas.

BACKGROUND

Some satellite communications systems provide multiple beams that connect diverse terrestrial regions through a satellite. In this context, a satellite may use multiple elements, which are also known as feeds, in a phased array or as part of a reflector antenna, to form one or more communication beams for communicating with terrestrial devices in the coverage areas of the communication beams. A satellite communications system may combine signals of an array of elements or feeds coherently to create one or more discrete beam shapes.

Formation of beams may be accomplished by adjusting the relative phase and/or gain of each signal path routed to each antenna element in order to create the desired beam pattern. The adjustments to each signal path may be determined based on determining the desired output out of each antenna element and then determining the adjustments to the relative phase and/or gain of each signal path necessary to produce the desired output.

DESCRIPTION OF DRAWINGS

Like reference symbols in the various drawings indicate like elements.

DETAILED DESCRIPTION

Figure 1:
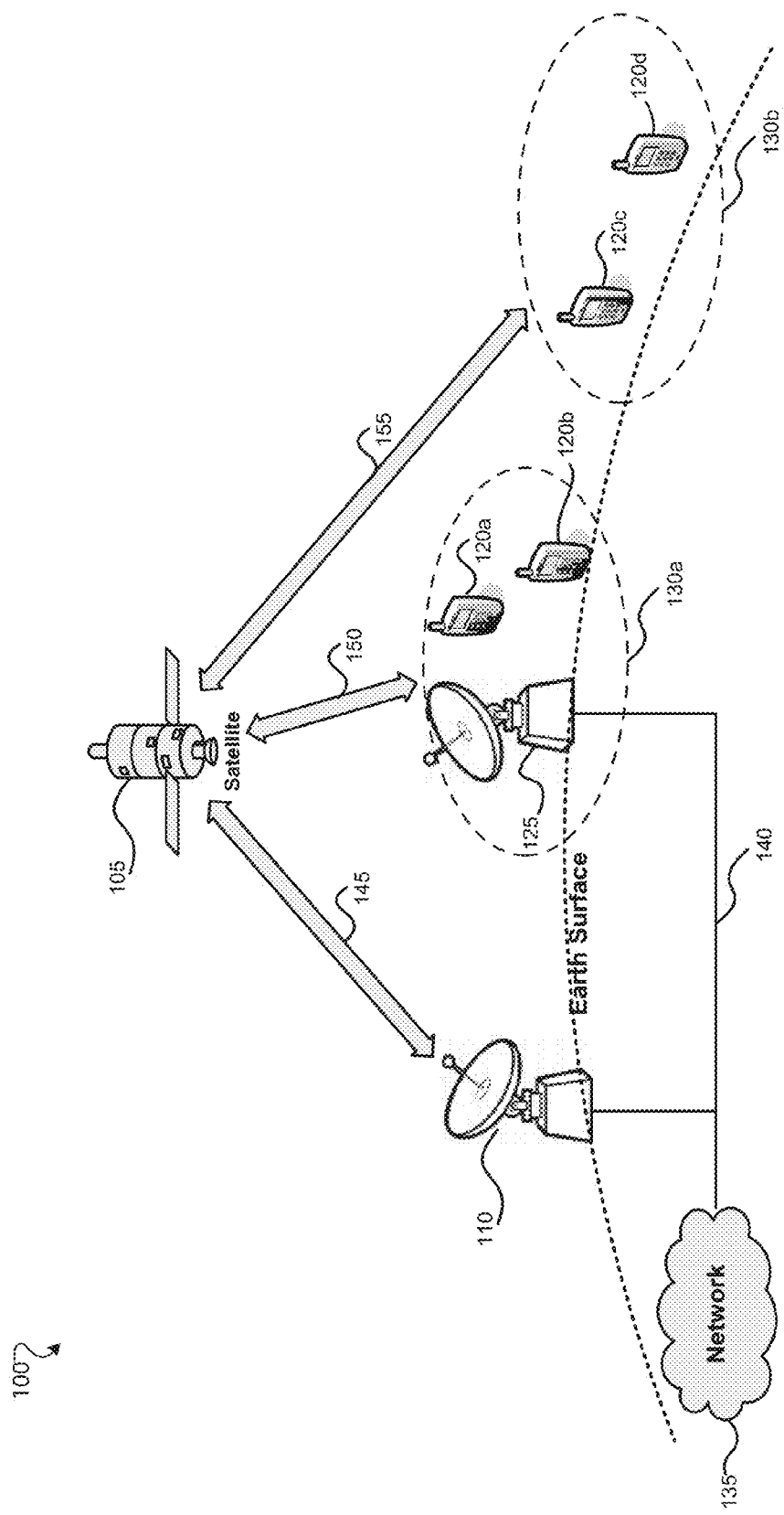
FIG. 1 illustrates an exemplary satellite system that is used for beamforming using multiple reflecting dishes.

In the context of a satellite communications system, a satellite may use multiple antenna elements, in, for example, a phased array antenna or as part of a reflector antenna, to form one or more communication beams for communicating with terrestrial devices. An antenna element, which is also known as a feed, refers to a resonating structure that is designed to transmit or receive electromagnetic energy in a frequency band (e.g., a microwave frequency band). In a beamforming satellite system, a signal stream is divided among each of the antenna elements. Beamforming is implemented by adjusting the relative phase and/or gain of each signal path routed to each element to thereby enable the energy radiated by each element to be coherently combined to create a beam pattern composed of one or more beams. The same approach can also be used in the receive direction where the received signals from each receiving element are coherently combined to create the beam pattern. The beamforming may be accomplished onboard the satellite by constructing a fixed beamforming network behind the element array using processors on board the satellite. Additionally or alternatively, the beamforming may be accomplished using a ground based beamforming (GBBF) system (i.e., a system on Earth) that calculates the relative amplitudes and phases that define each intended beam.

An important driver for the expense of beamforming satellites is the number of antenna elements required to be included in the satellite for creating beams. That is, satellites that have more antenna elements tend to cost more. Generally speaking, an increase in the number of elements in the satellite typically increases the area of the Earth in which the satellite is able to create beams, which is hereinafter referred to as the field of view of the satellite, and typically decreases the size of the smallest individual spot beam that can be produced by the satellite within its field of view.

Some satellites, hereinafter referred to as reflecting satellites, include one or more reflecting apertures, such as reflecting dishes, that each may include one or more reflecting surfaces that reflect or redirect the energy radiated from the array of elements in the satellite before the energy reaches the Earth and/or reflect or redirect the energy received from the Earth before the energy reaches the satellite array elements. Other satellites, hereinafter referred to as direct radiating satellites, include an array of elements that instead directly radiate energy from the satellite to the Earth or directly receive energy from the Earth without the energy being reflected or redirected by any surface or dish on the satellite.

Direct radiating satellites often enjoy the benefit of having a very large field of view, where each element in the satellite is typically able to radiate its energy to or receive energy from most locations of the hemisphere of the Earth closest to the satellite. A direct radiating satellite, however, often has a minimum spot beam size that is much larger than the minimum spot beam size of a reflecting satellite that has the same number of antenna elements. As such, direct radiating satellites, while typically having a larger field of view for the same number of elements as a reflecting satellite, may not be able to communicate as much data for a given frequency spectrum allocation as a result of their larger minimum spot beam size. That is, the larger minimum spot beam size may decrease the ability of the satellite to reuse frequencies over a same geographic area and, therefore, may limit the data that can be communicated over that geographic area for the same frequency spectrum allocation. Additionally, a larger minimum spot beam size often results in a decrease in signal gain, which reduces link budgets. Lower link budges may cause a decrease in the ability of the links to withstand detrimental environmental conditions, such as adverse weather, and may further decrease the amount of data that can be communicated over the links to a geographic area.

In contrast, reflecting satellites typically have a smaller field of view than direct radiating satellite antennas because the reflecting antennas use fixed reflecting apertures to focus the energy radiated from and/or received by the array of elements over a smaller geographic area. A reflecting antenna may thereby achieve a smaller minimum spot beam size than a direct radiating satellite having the same number of elements. While enjoying a smaller minimum spot beam size, the reflecting antenna, however, may have a smaller field of view than a direct radiating antenna having the same number of elements as a result of the focusing that occurs through use of the fixed reflecting apertures. The smaller field of view limits the satellite's flexibility in configuring beam coverage areas on the Earth.

To illustrate, an exemplary reflecting satellite positioned over the Western Hemisphere may include reflecting apertures that focus all of the energy radiated from or received by the satellite's elements over North America. As such, the reflecting satellite is able to form a beam pattern over any portion of North America but is not be able to form a beam pattern over South America. Such a reflecting satellite may enjoy the benefit of greater data throughput and more robust links due to its smaller minimum spot beam size, but may be limited in its communication service coverage to North America. In contrast, a direct radiating satellite having the same number of elements may be able to provide communication services to any location within the Western Hemisphere, rather than just to locations within North America. The direct radiating satellite may enjoy this greater communication services coverage flexibility but may suffer from lower data throughput and less robust links due to its larger minimum spot beam size.

An improved reflecting satellite communications system is proposed that utilizes a reflecting satellite having multiple reflecting apertures that, unlike the reflecting apertures on typical reflecting satellites, are not fixed in place after satellite deployment but rather are dynamically rotated/redirected during subsequent satellite operation to enable energy to be selectively radiated to and/or received from multiple different geographic areas of the Earth. Moreover, by applying the disclosed calibration techniques that take into account the relative phase and gain errors introduced by the motion and pointing direction differences between the two or more reflecting apertures, energy reflected or redirected from the two or more reflecting apertures can be coherently combined into a single beam or beam pattern produced by the elements of the satellite. The improved reflecting satellite communications system may thereby offer the benefits arising from use of a small minimum beam size, as typically found in conventional reflecting antenna communications systems, while providing the communications coverage area flexibility often found in conventional direct radiating satellite communications systems.

FIG. 1 illustrates an exemplary reflecting satellite system 100 that is used for beamforming using multiple reflecting apertures. In this exemplary system, the reflecting apertures are reflecting dishes. The satellite system 100 includes a satellite 105 connected through satellite channels to gateways 110 and 125, and user terminals 120a, 120b, 120c and 120d, which are located on the surface of the Earth. The satellite 105 transmits data to and receives data from the gateways 110, 125, and user terminals 120a, 120b, 120c and 120d. Gateway 125 and user terminals 120a and 120b are within formed beam coverage area 130a. User terminals 120d and 120e are within formed beam coverage area 130b.

That is, gateway 125 and user terminals 120a-120b are located within the geographic extent covered by spot beam 130a, while user terminals 120d-120e are located within the geographic extent covered by spot beam 130b. In other implementations, one or both of beams 130a and 130b are shaped beams rather than spot beams. The gateways 110 and 125 are terrestrially connected to each other and to a terrestrial network 135 through communications link 140.

The satellite 105 may be located at a geostationary orbital location defined by a longitude. Alternatively, the satellite 105 may be located at a different orbital location, for example, a medium earth orbit or a low earth orbit. While only a single satellite 105 is shown, a plurality of satellites may be used. The satellite 105 interconnects the gateway 110, the gateway 125 and user terminals 120a, 120b in spot beam 130a, and the user terminals 120c, 120d in spot beam 130b, through satellite communications channels. While only two gateways 110 and 125 are shown, more than two gateways may be employed. Similarly, more than two beams may be employed, and any number of user terminals may be used and distributed amongst a plurality of beam coverage areas. A beam may cover a geographic area that includes one or more gateways (e.g., spot beam 130a), or a beam may cover a geographic area that includes zero gateways (e.g., 130b).

The satellite 105 may include one or more computer processors used to dynamically perform the calibration calculations described in more detail below and, in some implementations, to perform calibrated beamforming calculations to form a desired beam pattern. The satellite 105 may include multiple antenna elements or feeds to enable transmission of information in both directions from the satellite 105 to the gateways or user terminals. The feeds transmit signals to or receive signals from the gateways 110, 125 and the user terminals 120a-120d.

The satellite 105 also may include multiple reflecting dishes for reflecting or redirecting the energy used to form the beams. A reflecting dish may be configured to redirect the beam formed by a given set of feeds. The spot beams 130a and 130b may be formed by different reflecting dishes redirecting the energy of their respective feeds. In an alternative implementation, the orientation of the reflecting dishes may be configured such that the spot beams 130a and 130b are combined together to form a single spot or shaped beam covering a contiguous geographical area on the Earth's surface.

Unlike the reflecting dishes of typical reflecting satellites, the reflecting dishes in the satellite 105 may be mounted on, for example, gimbals to enable the satellite to dynamically rotate the reflecting dishes to change the beam locations on the surface of the Earth after satellite deployment and during subsequent satellite operation. This ability to rotate the reflecting dishes enables the satellite 105 to dynamically change its field of view during operation and, thereby, provides the satellite with much greater communications services coverage flexibility than typical reflecting satellites in that the satellite 105 is able to place beams in a much greater portion of the hemisphere of the Earth closest to the satellite by rotating the reflecting dishes as necessary during satellite operation.

Notably, many typical reflecting satellites have gimbals that are used to rotate the satellite's reflecting dishes for the purpose of deploying the dishes upon the satellite reaching its prescribed orbital location (e.g., its prescribed longitudinal location in a geosynchronous orbit). These gimbals, however, are different from those of the satellite 105 in that they are not then subsequently used to further dynamically change the satellite's field of view during subsequent satellite operation by further rotating the reflecting dishes after deployment. Instead, after satellite deployment, the gimbals of a typical reflecting satellite, unlike those of satellite 105, are no longer used and the orientation of the reflecting dishes and, therefore, the satellite's field of view remains fixed for subsequent satellite operation until the satellite either expires or is otherwise instructed to change its orbital location.

Each of the reflecting dishes (or, more generally, reflecting apertures) is susceptible to different vibrations or movements as the satellite 105 moves (e.g., in response to periodic thrusts made by the satellite for orbit corrections). As such, at any given time, each reflecting dish of the satellite 105 may have a different pointing direction and may impart a different delay to any energy reflected (or redirected) by the dish. This relative pointing error and delay difference, without calibration, may result in the inability to coherently combine the energy of elements reflected by one reflecting dish with the energy of elements reflected by a different reflecting dish. That is, without calibration, the pointing error and delay difference imparted to the signals by the different reflecting dishes may prevent signals reflected by multiple different reflecting dishes from being used to form a single contiguous coverage area or spot beam because of undesirable interference effects that may arise due to the incoherent combining of the multiple signals from the different dishes. To address this problem, the satellite 105 includes computer processors that perform a calibration routine to monitor and periodically or continuously correct the pointing error imparted on the signals by the different relative motion of each reflecting dish and the relative delays (and hence phase differences) imparted on the signals by the different relative motion of each reflecting dish. An exemplary calibration routine is described in more detail below.

A subset of the antenna elements or feeds in the satellite 105 may be used for transmission in the forward direction from the satellite 105 to the gateways 110 and 125, and the user terminals 120a-120d. These elements are referred to as the forward link elements or forward link feeds. The remaining elements may be used for transmission in the return direction from the gateways 110, 125 and the user terminals 120a-120d to the satellite 105. These elements are referred to as the return link elements, return link feeds, receiving elements or receiving feeds. Each element may have its own distinct radiation pattern that may be different from the radiation pattern associated with any other element.

The gateways 110 and 125 are coupled to the network 135 through a communications link 140. The network 135 may be a non-public data network, a public data network or a combination of public and non-public data networks, e.g., the Internet. The communications channel 140 may be a high-speed terrestrial connection, such as an optical connection with data rates in the range of gigabits per second. In an alternative implementation, the communications channel 140 also may be a satellite communications channel through a satellite that is different from the satellite 105.

The gateways 110 and 125 may include one or more modules that process signals exchanged with the satellite elements for beamforming. The gateways 110 and 125 may transmit signals to the satellite 105 over the satellite return links for phase and/or gain calibration for the return link and the forward link. The signals used for phase and/or gain calibration may include unique code words that identify such signals as being configured for phase and/or gain calibration. The satellite 105 may measure the phase and gain of the transmitted calibration signals to enable calibration and/or pointing correction. The communications link 140 may be part of a closed network accessible only to components of the satellite communications system 100, or may be part of an open network that connects the gateway 110 to the network 135.

The user terminals 120a-120d are computing devices able to communicate data to and from the satellite 105 over a satellite link. For example, the user terminals 120a-120d may be handheld mobile telephones or car phones, personal digital assistants, laptop personal computers, desktop personal computers, and/or geographically fixed phone booths. The user terminals in separate satellite coverage areas serviced by different formed beams may communicate with each other and with the gateways 110 and 125 over the satellite 105 via the satellite links 145, 150 and 155. Each satellite link 145, 150 or 155 includes both an uplink to the satellite 105 and a downlink from the satellite 105.

Figure 2A:
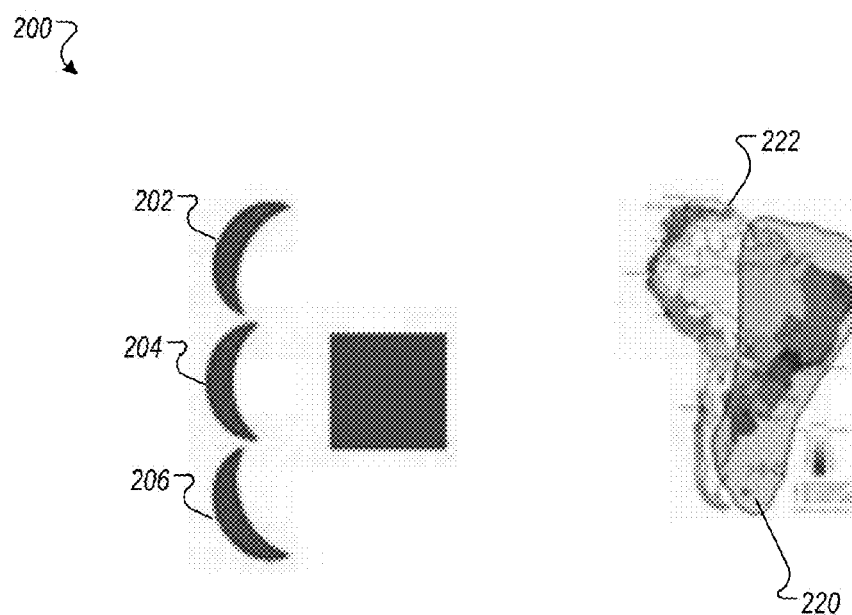
FIGS. 2A and 2B illustrate exemplary orientations of reflecting dishes on a satellite for generating diverse beams.
Figure 2B:
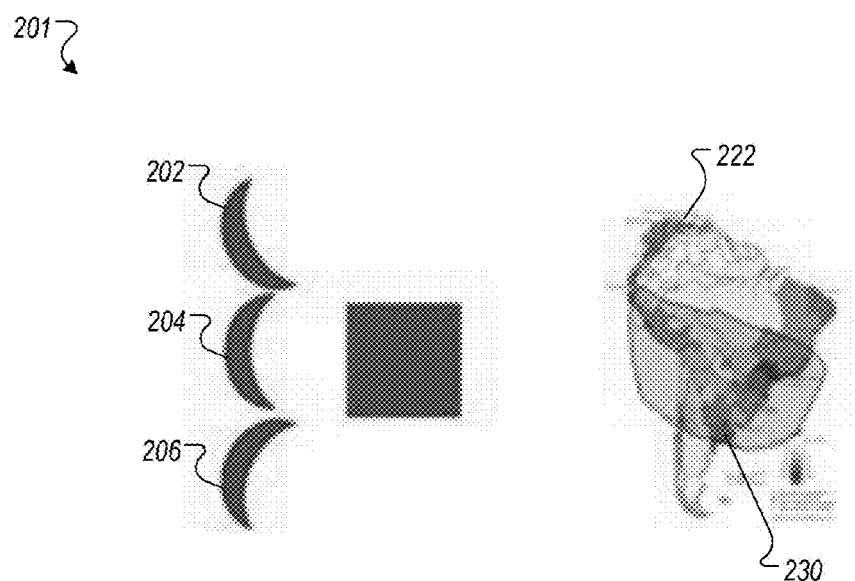

FIGS. 2A-2B illustrate exemplary orientations 200 and 201 respectively, of reflecting dishes on a satellite for generating diverse beams. The orientations 200 and 201 may be implemented by entities of the satellite system 100, such as the satellite 105. The following describes the orientations 200 and 201 as being implemented by components of the satellite system 100. However, the orientations 200 or 201 may be implemented by other systems or system configurations.

In FIG. 2A, three reflecting dishes 202, 204 and 206 on a satellite are positioned in an orientation 200 that enables beams to be formed at any arbitrary location within area 220 on the Earth's surface 222. That is, by selecting the appropriate beamforming coefficients and properly calibrating to correct for the pointing differences and phase differences imparted on the signals by the different dishes 202, 204 and 206, the satellite may form a beam anywhere within the geographic area 220 shown in FIG. 2A. Notably, when the dishes 202, 204 and 206 are in positions corresponding to orientation 200, the satellite is typically not able to form beams in geographic locations outside of the geographic area 220 shown in FIG. 2A. Area 220 is, therefore, the satellite's field of view when the reflecting dishes 202, 204 and 206 have the orientation 200.

In some implementations, each reflecting dish reflects or redirects the energy for a different set of elements or feeds (e.g., each reflecting dish may be assigned a subset of the total feeds of the satellite). In the forward direction, a signal stream is divided among each of multiple different antenna elements, such as, transmitting radio frequency (RF) elements. Beamforming phase and gain coefficients that take into account calibration are selected for each signal and are communicated to each corresponding transmitting RF element to thereby form a beam of a desired shape at a desired location within the geographic area 220. The selected phase and gain coefficients are coefficients that have been adjusted as a result of a calibration routine to correct for the pointing error and phase error imparted on the signal due to the relative motion of the reflecting dishes 202, 204 and 206. The adjustment of the phase and gain coefficients of the signal ensures that the signal coherently combines with other signals to form the desired beam shape at the desired location on the Earth's surface 222 despite the relative motion between dishes 202, 204 and 206. Similarly, in the receive direction, the phase and gain of the signals received by the receive elements from energy that was reflected by the reflecting dishes 202, 204 and 206 may be adjusted by the calibration routine prior to being combined to thereby enable the signals to be combined coherently to form a desired beam shape received from a desired location within the geographic area 220.

Each of the reflecting dishes 202, 204 and 206 may be independently gimbaled in order to change the satellite's field of view to redirect energy to new geographic areas over the Earth's surface. Because the multiple reflecting dishes with unique feed areas are independently controlled, both the location and the shape of the desired field of view can be dynamically changed during satellite operation. This provides additional flexibility in beamforming. Once the reflecting dishes 202, 204 and 206 are gimbaled, beamforming is used to create beams with arbitrary locations within the new field of view.

FIG. 2B illustrates the three reflecting dishes 202, 204 and 206 after having been further gimbaled to arrive at a different orientation 201 that provides a new field of view 230. When the dishes 202, 204 and 206 have orientations corresponding to orientation 201, the location and shape of the field of view 230 is different from the location and shape of the field of view 220. As such, the satellite is now able to place beams of different shapes at arbitrary locations within a different portion of the surface 222 of the Earth.

Figure 3A:
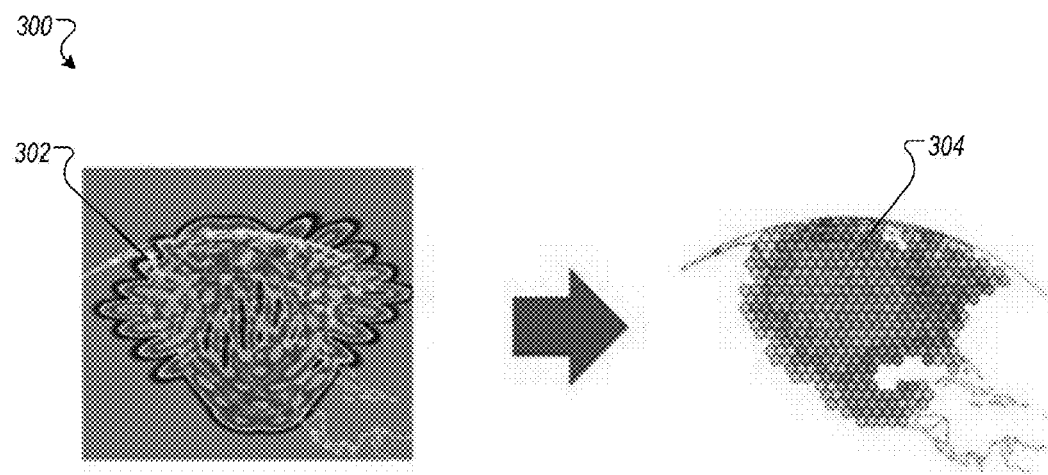
FIGS. 3A and 3B illustrate exemplary energy patterns and spot beams for a beamforming satellite
Figure 3B:
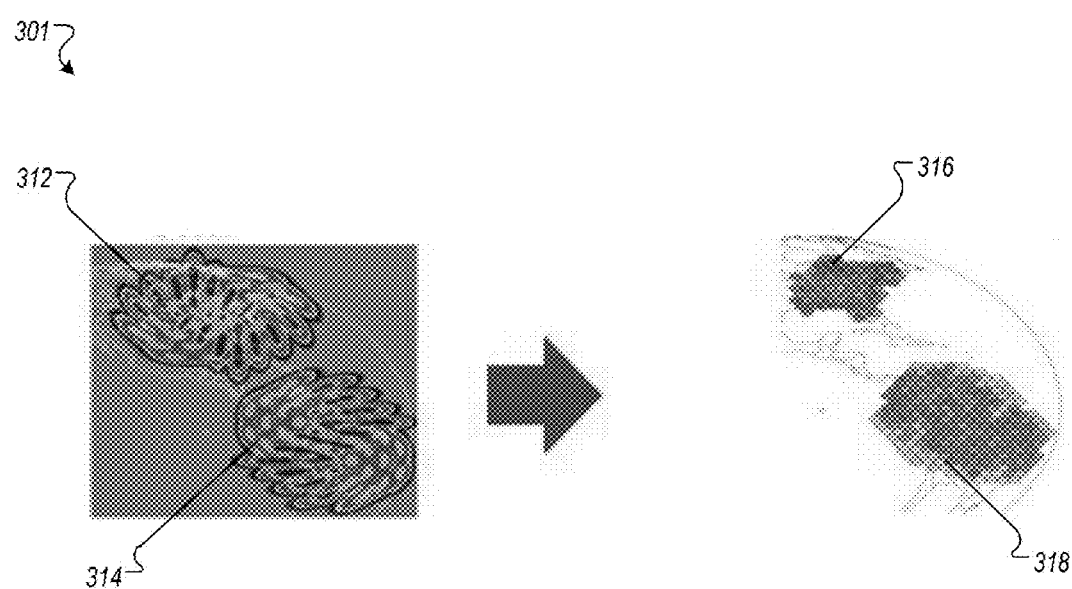

FIGS. 3A-3B illustrate exemplary combinations 300 and 301 respectively, of feeds on a satellite for generating diverse beams. The combinations 300 and 301 may be implemented by entities of the satellite system 100, such as the satellite 105. The following describes the combinations 300 and 301 as being implemented by components of the satellite system 100. However, the combinations 300 and 301 may be implemented by other systems or system configurations.

The combination 300 illustrates the patterns 302 and the beams 304 that may be formed by a set of feeds that transmit and/or receive energy that is reflected by a set of reflecting dishes having a first orientation. The patterns 302 correspond to the aggregate beam energy for the feeds before beamforming is performed. The geographic extent of the patterns 302 is the satellite's field of view when the reflecting dishes have the first orientation. By selecting the appropriate beamforming coefficients, any or all of the beams 304 may be formed by the feeds on the surface of the Earth.

The combination 301 illustrates patterns 312, 314 and beams 316, 318 that may be formed by the same set of feeds using the same set of reflecting dishes when the set of reflecting dishes have a second orientation different from the first orientation. The patterns 312 correspond to the aggregate beam energy from a subset of the feeds associated with a subset of the reflecting dishes. Any or all of the beams 316 may be formed on the surface of the Earth by selecting appropriate beamforming coefficients for the feeds having the patterns 312. The patterns 314 correspond to the aggregate beam energy from a different subset of the feeds associated with a different subset of reflecting dishes. Any or all of the beams 318 may be formed on the surface of the Earth by selecting appropriate beamforming coefficients for the feeds having the patterns 314. The geographic extent of the patterns 312 and 314 is the satellite's field of view when the set of reflecting dishes have the second orientation. The different patterns 302, 312 and 314, and the corresponding beams 304, 314 and 316, may be formed by the same set of feeds because of the independent gimbaling of the reflecting dishes associated with the feeds to thereby change the orientation of the reflecting dishes from the first orientation to the second orientation.

Figure 4:
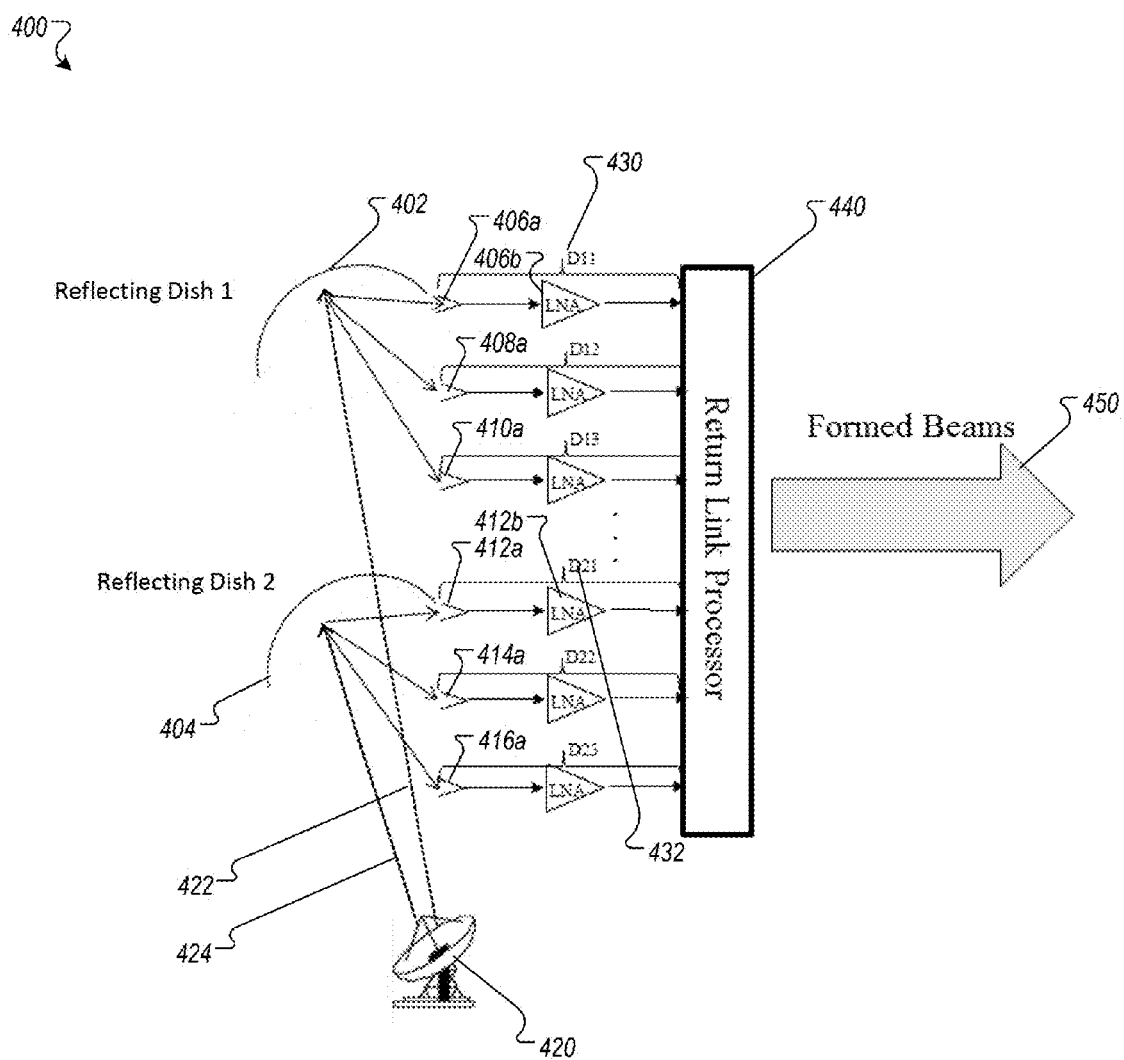
FIG. 4 shows an architecture used for return link beamforming with multiple reflecting dishes and return link feeds on a satellite.

FIG. 4 shows an architecture 400 used for return link beamforming with multiple reflecting dishes and return link feeds on a satellite. The architecture 400 may be implemented by entities of the satellite system 100, such as the satellite 105. The following describes the architecture 400 as being implemented by satellite 105 of the satellite system 100. However, the architecture 400 may be implemented by other systems or system configurations.

The architecture 400 includes reflecting dishes 402 and 404 coupled with multiple antenna elements 406a, 408a, 410a, 412a, 414a and 416a. Low noise amplifiers (LNAs) 406b and 412b are associated with the antenna elements. Signals 422 and 424 generated by terrestrial gateway 420 are received along the return link paths and forwarded to the return link processor 440 using return link circuitry such as 430 and 432. The return link processor 440 processes the signals to generate formed beams 450.

Although only two reflecting dishes 402 and 404 are shown, the architecture 400 may include several more reflecting dishes. Each reflecting dish may reflect the energy, which is typically RF energy, associated with a subset of antenna elements or feeds. For example, reflecting dish 402 may reflect the energy for feeds 406a, 408a and 410a, while reflecting dish 404 may reflect the energy for feeds 412a, 414a and 416a. Although only six feeds are shown, the architecture 400 may include a different number of feeds, and each reflecting dish may act as a reflector for a greater or a lesser number of feeds than shown.

Each feed is associated with a low noise amplifier (LNA), which together are included in the return link circuitry that acts as a conduit for the feed signal from the reflecting dish to the return link processor. For example, feed 406a is associated with LNA 406b, and together are part of the return link circuitry 430, while feed 412a is associated with LNA 412b, and together are part of the return link circuitry 432. Feeds 408a, 410a, 414a and 416a are likewise associated with LNAs and return link circuitry. LNA 406b or 412b is an electronic amplifier used to amplify weak signals received on the return link that were reflected by the respective reflecting dishes.

The architecture 400 may be used for calibration of the beamforming coefficients of the satellite 105 to correct the phase difference and pointing direction errors introduced into the return signals by the relative motion of the reflecting dishes 402 and 404. Specifically, the calibration routine produces: (1) a pointing error for each reflecting dish that represents the difference between the assumed pointing direction of the dish and the actual pointing direction of the dish; and (2) a phase error for each feed that represents the phase change imparted on the feed signal by the motion or vibration of the dish off of which the signal is reflected.

The pointing error for each reflecting dish may be determined in various different ways. For example, standard techniques for detecting with a monopulse radar (as described by Robert M. Page, "Monopulse Radar", IRE National Conference Record vol 3, part 8, 1955) can be used to detect a beacon on the surface of the earth. By examining the difference between the nominal position of the beacon in the satellite's field of view and the current difference, it is possible to determine the pointing error of the satellite. The pointing error for each dish also can be determined using the pointing error estimation techniques described in application Ser. No. 13/053,174, titled "Amplitude Calibration Estimation," which is hereby incorporated by reference for all purposes. In some implementations, the pointing error of a dish is represented as a combination of a pitch error value and a roll error value. In other implementations, the pointing error of a dish is represented as a combination of a pitch error value, a roll error value, and a yaw error value.

The phase error for each feed on each dish may be determined using the processes 600 and 700 described below with respect to FIGS. 6 and 7. Each of these processes relies on phase measurements made by the satellite of calibration signals received by the satellite from one or more gateways or calibration earth stations (CESs) on the Earth. Specifically, the one or more CESs may transmit unique codewords continuously or periodically (e.g., once every 0.5 milliseconds) to the satellite using a predetermined set of multiple different frequencies. The satellite receives the codeword signals on each of its feeds and performs a measurement of the phase of the codeword signals on each feed. These measurements may then be used in accordance with processes 600 and 700 to determine the signal delay for each feed on each dish in both the return and the forward directions that is caused by the motion of the reflecting dishes. The return link delay and the forward link delay for each feed may be converted into corresponding phase errors and used to adjust the selection of beamforming coefficients to thereby compensate for the relative movement of the reflecting dishes.

In some implementations, each of the CESs transmits the same codeword on each of the two or more different frequencies. In other implementations, each of the CESs is assigned its own different codeword for calibration and sends its codeword over each of the two or more different frequencies. In some implementations, a different unique codeword is transmitted by the CESs for each of the two or more different frequencies.

Notably, the satellite may concurrently receive both calibration signals from CESs and other signals containing data from transmitting devices on the surface of the earth (e.g., from user terminals and/or gateways/CESs). The satellite typically performs the calibration routine prior to processing the other signals to enable the proper selection of the beamforming coefficients necessary to process the other signals. Because the reflecting dishes on the satellite may move/vibrate differently at any instant in time, the calibration signals are preferably continuously or periodically (e.g., once every 0.5 milliseconds) transmitted to the satellite to enable the satellite to quickly and dynamically determine the corresponding pointing direction and phase errors caused by the movement of the reflecting dishes and to then correct for these errors in the beamforming.

For example, in the implementation shown in FIG. 4, a gateway 420 may transmit a first calibration signal that includes a unique codeword over a particular frequency $f_1$. FIG. 4 represents the unique codeword signal as a signal 422 reflected by reflecting dish 402 and a signal 424 reflected by reflecting dish 404. Specifically, the signal 422 is reflected by the dish 402 and received by the return link feeds 406*a*, 408*a* and 410*a*, and subsequently forwarded by each link to the return link processor 440 through the respective LNAs and return link circuitry associated with the return link feeds. Similarly, the signal 424 is reflected by the dish 404 and received by the return link feeds 412*a*, 414*a* and 416*a*, which forward the signal 424 to the return link processor 440 through the respective LNAs and return link circuitry associated with the return link feeds.

In some implementations, the return link processor 440 measures the phase of the received signal 422 for each return link feed 406*a*, 408*a*, and 410*a* and measures the phase of the received signal 424 for each return link feed 412*a*, 414*a* and 416*a*. The measured phase of the first calibration signal for each feed may then be stored for later access during calibration. The gateway 420 also may transmit a second calibration signal that includes a unique codeword over a second frequency $f_2$. In some implementations, the unique codeword in the second calibration signal is the same as the unique codeword in the first calibration signal. In other implementations, the unique codeword in the second calibration signal is different from the unique codeword in the first calibration signal. The second calibration signal is processed in the same manner described above for the first calibration signal and corresponding measured phases for each of the return link feeds for the second calibration signal are stored for later access during calibration.

Notably, any data signals received by the return link feeds 406*a*, 408*a*, 410*a*, 412*a*, 414*a* and 416*a* may be formed into beams 450 by combined the data signals using beamforming coefficients that correct for the pointing and phase errors determined by the calibration routine. In the implementation described above, the return link processor 440 performed the calibration routine to determine the pointing and phase errors. The return link processor 440 may additionally determine the beamforming coefficients (i.e., determine the phase and/or gain values to be applied to each feed signal prior to combining the signals to form the beam(s)). In other implementations, the satellite may include a calibration processor, subsystem or device for executing the calibration routine and a different beamforming processor, subsystem or device for determining the beamforming coefficients taking into account the results generated by the calibration routine.

Figure 5:
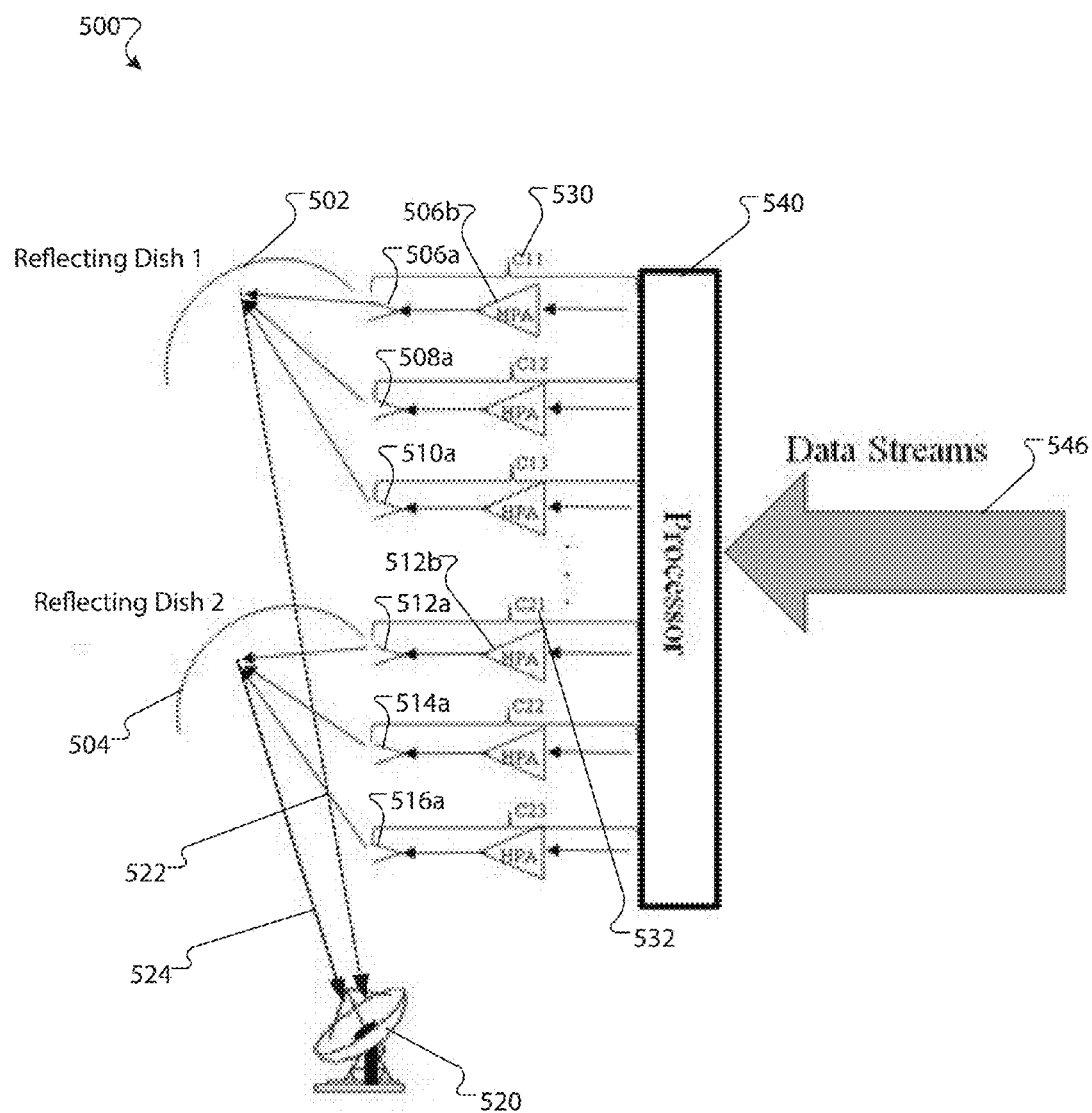
FIG. 5 shows an architecture used for forward link beamforming with multiple reflecting dishes and forward link feeds on a satellite.

FIG. 5 shows an architecture 500 used for forward link beamforming with multiple reflecting dishes and forward link feeds on a satellite. The architecture 500 may be implemented by entities of the satellite system 100, such as the satellite 105. The following describes the architecture 500 as being implemented by satellite 105 of the satellite system 100. However, the architecture 500 may be implemented by other systems or system configurations.

The architecture 500 includes reflecting dishes 502 and 504 coupled with multiple transmit antenna elements or feeds 506*a*, 508*a*, 510*a*, 512*a*, 512*a* and 514*a*. High power amplifiers (HPAs) 504*b* and 512*b* are associated with the antenna elements.

Data streams 546 are received by the processor 540. The processor 540 performs a calibration routine to determine a phase error and pointing error for each forward link feed that is caused by the relative motion of dishes 502 and 504. The processor 540, or another processor or subsystem, may select appropriate beamforming coefficients for each forward link feed that correct for the determined phase and pointing errors. The processor 540 may use the beamforming coefficients to determine the appropriate signals to be transmitted by each forward link feed to thereby communicate the data from the data streams 546 as one or more beams down to the Earth.

Specifically, each forward link circuitry includes a high power amplifier (HPA) and an associated transmit feed. The signal energy corresponding to the data streams 546 is divided between the transmit feeds, which radiate the energy out forming beams. The signal energy from the feeds 506*a*, 508*a* and 510*a* is reflected by the reflecting dish 502, and the signal energy from the feeds 512*a*, 514*a* and 516*a* is reflected by the reflecting dish 504. The gateway 520 receives the reflected energy from the various dishes and is able to extract the data from the received energy.

Although only two reflecting dishes 502 and 504 are shown, the architecture 500 may include several more reflecting dishes. Each reflecting dish may reflect the energy, e.g., RF energy, associated with a predetermined subset of antenna elements or feeds. As noted above, the reflecting dish 502 may reflect the energy radiated by feeds 506*a*, 508*a* and 510a, while reflecting dish 504 may reflect the energy radiated by feeds 512a, 514a and 516a. Although only six feeds are shown, the architecture 500 may include a different number of feeds, and each reflecting dish may act as a reflector for a greater or a lesser number of feeds than shown. In one implementation, the transmit feeds 506a, 508a, 510a, 512a, 514a and 516a are the same as the receive feeds 406a, 408a, 410a, 412a, 414a and 416a, such that each feed is a dual feed able to both receive and transmit signals. Similarly, the reflecting dishes 502 and 504 are the same as the reflecting dishes 402 and 404.

As noted above, each feed is associated with a HPA, which together form part of a forward link circuitry that acts as a conduit for the feed signal transmitted from the processor 540 to the respective reflecting dish. For example, feed 506a is associated with HPA 506b, and together they form part of forward link circuitry 530, while feed 512a is associated with HPA 512b, and together they form part of forward link circuitry 532. Feeds 508a, 510a, 514a and 512a are likewise associated with HPAs and forward link circuitry. HPA 506b or 512b is an electronic amplifier used to increase the power of the feed signals corresponding to the data streams 546 before the signals are radiated by the feeds and reflected by the reflecting dishes as forward link signals 522 and 524.

In the implementation described above, the processor 540 performed the calibration routine to determine the pointing and phase errors. The processor 540 may additionally determine the beamforming coefficients (i.e., determine the phase and/or gain values to be applied to each feed signal prior to combining the signals to form the beam(s)). In other implementations, the satellite may include a calibration processor, subsystem or device for executing the calibration routine and a different beamforming processor, subsystem or device for determining the beamforming coefficients. In some implementations, the processor 540 and the return link processor 440 are the same processor.

Figure 6:
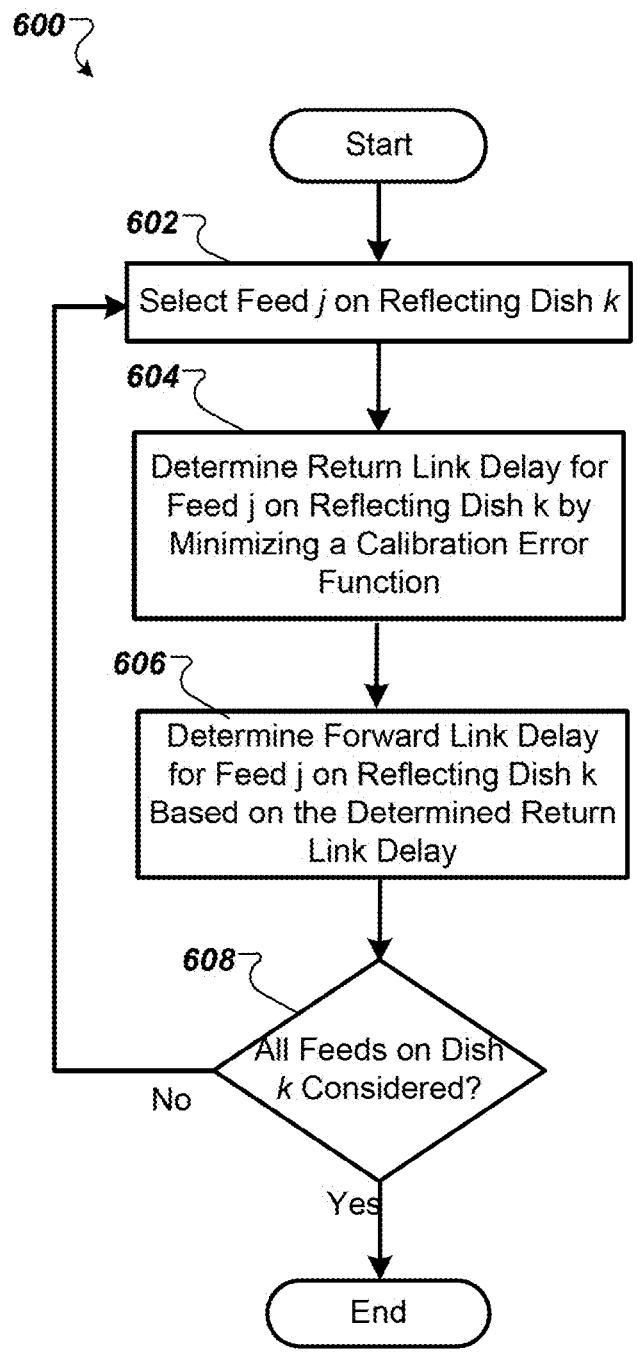
FIG. 6 is a flow chart illustrating an exemplary process for computing return and forward link delays for all feeds on a reflecting dish on a beamforming satellite.

FIG. 6 is a flow chart illustrating an exemplary calibration process 600 for computing return and forward link delays for feeds on a beamforming satellite having multiple reflecting dishes, where the delays are caused by the relative motion or vibration of the multiple reflecting dishes. The process 600 may be performed by components of the satellite system 100. For example, the process 600 may be performed by the satellite 105 in conjunction with one of the gateways 110 or 125. The following describes the process 600 as being performed by components of the system 100. However, the process 600 may be performed by other systems or system configurations.

The process 600 is executed by selecting a feed j that receives and/or transmits energy reflected by a reflecting dish k on the beamforming satellite (602). For example, the feed j may be one of feeds 406a, 408a or 410a, and the reflecting dish k may be dish 402.

After selecting a feed j on a dish k, the process 600 calculates a return link delay $DR_{jk}$ that minimizes a calibration error function (604). For example, the process 600 may select candidate delay values D from a search space that is determined for the return link delay $DR_{jk}$. In one implementation, the search space for the delay D is determined using intelligent guessing, while in other implementations, the search space for the delay D may be determined based on historical data. For every candidate delay value D, the process 600 computes a value for an error function that is based on a difference in phase between measured phase values for multiple different calibration signals having different frequencies received by feed j and the corresponding phase values calculated at those frequencies for feed j using the candidate delay D. The process 600 computes multiple different candidate delay values D and their corresponding errors and then selects the candidate delay value D that results in the minimum error as the return link delay $DR_{jk}$. Process 700, which is described below in reference to FIG. 7, is an example implementation of operation 604 of process 600.

Once the return link delay $DR_{jk}$ is calculated, the process 600 determines the forward link delay $DF_{jk}$ of feed j on reflecting dish k based on the calculated return link delay $DR_{jk}$ (606). For example, the process 600 may compute the forward link delay $DF_{jk}$ of feed j on reflecting dish k using the equation:

$$DF_{jk} DR_{jk} + D_{jk} - C_{jk} \quad (2)$$

where:
$DF_{jk}$=the delay of the entire forward link for feed j on reflecting dish k,
$DR_{jk}$=the delay of the entire return link for feed j on reflecting dish k,
$D_{jk}$=the delay of the forward link on the satellite for feed j on reflecting dish k, and
$C_{jk}$=the delay of the return link on the satellite for feed j on reflecting dish k.

As noted above, the value of $D_{jk}$ represents the signal delay of the forward link on the satellite, i.e., the time that an analog signal transmitted by the feed j takes to traverse the satellite (e.g., traverse the wires and/or circuit elements in the satellite) before being converted into radiated energy by the feed's transmitter and then combined with other radiated signals into beams. Similarly, the value of $C_{jk}$ represents the signal delay of the return link on the satellite, i.e., the time that an analog signal received by the feed j takes to traverse the satellite (e.g., traverse the wires and/or circuit elements in the satellite) before being combined with other received analog signals by the satellite to form a beam. The values of $D_{jk}$ and $C_{jk}$ may be measured before either the satellite is launched, and/or they may be measured continuously while the satellite is in orbit. Notably, because the transmit path may have different wires and/or circuit elements than the receive path, the values of $D_{jk}$ and $C_{jk}$ may be different.

The equation (2) may be used when the satellite will operate in an environment that is not particularly noisy. However, if the satellite will be operating in a particularly noisy environment, a statistical calculation may be used to better estimate the delays along each path. For example, a minimum mean square error or a maximal likelihood estimate of the delays may be calculated.

Once the return and forward link delays $DR_{jk}$ and $DF_{jk}$ for feed j on a reflecting dish k are computed, the process 600 checks whether all feeds on reflecting dish k have been considered (608). If the process 600 determines that not all feeds on reflecting dish k have been considered, then the process 600 selects a new feed j on reflecting dish k (602) and proceeds to compute the return and forward link delays for the new feed j in a manner described as above. However, if the process 600 determines that all feeds on reflecting dish k have been considered, then the process 600 terminates for reflecting dish k.

The process 600 is repeated for all reflecting dishes on the beamforming satellite such that return and forward link delays for all feeds on all reflecting dishes are computed. The return and forward link delays along with the calculated roll and pitch pointing errors on each reflecting dish may be used to calculate the phase and gain beamforming coefficients. This enables beamforming to occur over all feeds in all reflecting dishes.

Figure 7:
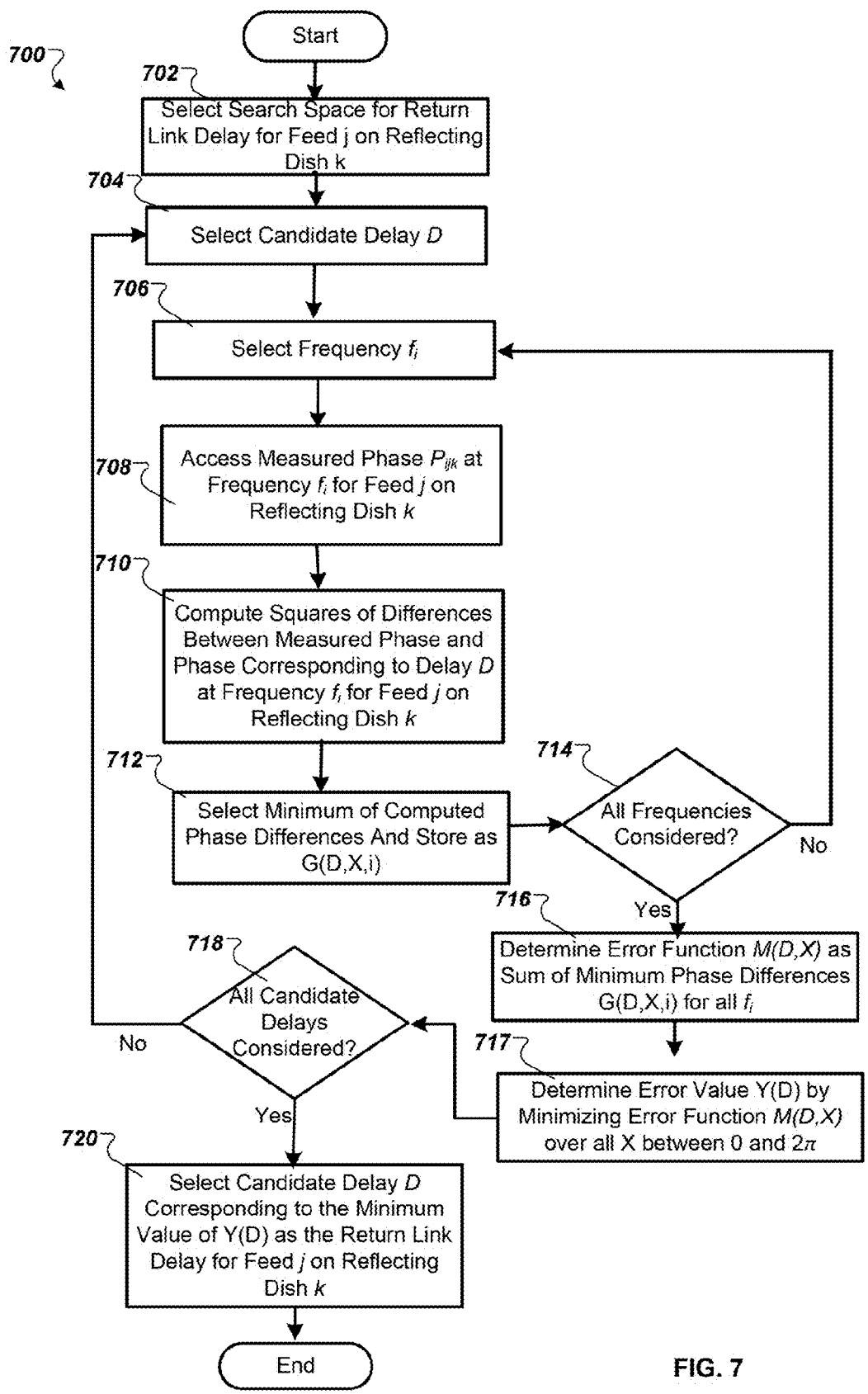
FIG. 7 is a flow chart illustrating an exemplary process for computing absolute return link delay for a feed on a reflecting dish on a beamforming satellite.

FIG. 7 is a flow chart illustrating an exemplary process 700 for computing a return link delay $DR_{jk}$ for a feed j on a reflecting dish k on a beamforming satellite. The process 700 may be performed by components of the satellite system 100. For example, the process 700 may be performed by the satellite 105 in conjunction with one of the gateways 110 or 125. The process 700 is an example implementation example of operation 604 of process 600. The following describes the process 700 as being performed by components of the system 100. However, the process 700 may be performed by other systems or system configurations.

A search space for the return delay $DR_{jk}$ that minimizes the error in calibration is determined (702). For example, as described previously, in one implementation, the search space for the return delay $DR_{jk}$ is determined using intelligent guessing. In another implementation, the search space for the return delay $DR_{jk}$ may be determined based on historical data. In some implementations, the same search space for the return delay $DR_{jk}$ may be applied to every feed on every reflecting dish. In other implementations, different search spaces for the delay $DR_{jk}$ may be associated with different feeds and/or different reflecting dishes.

The rest of the process 700 is described with respect to one feed j that receives a signal reflected by reflecting dish k. Once the search space for the return delay $DR_{jk}$ is determined, the process 700 selects a candidate delay D for the feed j in consideration (704). The candidate delay D is selected from the search space for the return delay $DR_{jk}$. In one implementation, the candidate delay D is selected based on intelligent guessing, while in other implementations, the candidate delay D is selected based on some other method, e.g., sampling using a uniform distribution.

A frequency fi is selected from among a set of multiple frequencies used for the calibration process (706). For example, the calibration signals transmitted during the calibration routine may be transmitted over only two different frequencies $f_1$ and $f_2$, and execution of operation 706 may result in selection of the frequency $f_1$. In some implementations, the frequencies selected are a handful of equally spaced frequencies across the band of interest. For example, if the band ranges from 16 to 16.5 GHz, the set of multiple frequencies may be 16, 16.1, 16.2, 16.3, 16.4 and 16.5 GHz. In general, adding more frequencies may increase the accuracy of the estimated return delay $DR_{jk}$.

A measured phase $P_{ijk}$ is accessed (708). The phase $P_{ijk}$ is the phase measured by the satellite of a calibration signal that was transmitted by a gateway or CES over the selected frequency $f_i$ and received by the feed j after being reflected by the dish k. For example, the feed in consideration may be feed 406a. The terrestrial gateway 420 may transmit a calibration signal with a unique code word to the reflecting dish 402. The calibration signal is reflected off of the dish 402 and received by the feed 406a, which forwards the calibration signal to the return link processor 440 via the LNA 406b and the circuitry 430. The return link processor 440 computes the phase $P_{ijk}$ of the signal having the frequency $f_i$ ("i") for the feed 406a ("j") reflected by reflecting dish 402 ("k").

In one particular example, the phase $P_{ijk}$ is designated as $P_{111}$ to represent a phase measured for a calibration signal having a frequency $f_1$ that was received by feed "1" after being reflected by dish "1." The transmission of calibration signals having unique codewords from gateways or CESs to the satellite was described previously with respect to FIG. 4.

In some implementations, the phase $P_{ijk}$ may be previously stored in a data store and subsequently accessed from the data store during execution of operation 708. In other implementations, the phase $P_{ijk}$ is measured on demand by the satellite while performing operation 708. In some implementations, all of the phases $P_{ijk}$ for all of the frequencies $f_i$ over which calibration signals are transmitted and for all of the feeds j and all of the dishes k in the satellite are measured and stored prior to execution of process 700. In other implementations, all phases $P_{ijk}$ for all of the frequencies $f_i$ used in the calibration process and for all feeds j and all dishes k in the satellite are measured on demand during execution of operation 708 or during execution of one or more other operations of process 700, without being previously stored. In yet other implementations, some measured phases $P_{ijk}$ are previously stored before execution of process 700 while others are measured on demand during execution of one or more operations of process 700.

The process 700 computes squares of differences between the measured phase $P_{ijk}$ and the phase of a signal having a frequency $f_i$ that is delayed by an amount of time equal to the candidate delay D (710). For example, after accessing the phase $P_{ijk}$ for a signal having the frequency $f_i$ received at the feed 406a after being reflected by dish 402, the return link processor 440 may compute the following three parameters:

$$(P_{ijk}-2\pi Df_i-X)^2; \tag{1}$$

$$(2\pi+P_{ijk}-2\pi Df_i-X)^2; \text{ and} \tag{2}$$

$$(-2\pi+P_{ijk}-2\pi Df_i-X)^2. \tag{3}$$

The term, $P_{ijk}-2\pi Df_i-X$, that is included in the first parameter is the direct difference between the measured phase $P_{ijk}$ and the estimated phase $2\pi Df_i$, accounting for a frequency-independent phase variable X that arises due to noise or other environmental or structural variables that impart an additional frequency-independent signal delay. The term, $2\pi+P_{ijk}-2\pi Df_i-X$, included in the second parameter and the term, $-2\pi+P_{ijk}-2\pi Df_i-X$, included in the third parameter are the $2\pi$ complement and the $-2\pi$ complement of the difference between the measured phase $P_{ijk}$ and the estimated phase $2\pi Df_i$, accounting again for the frequency-independent phase variable X. The second and third parameters are included in the calculus because of the fact that phase repeats every $2\pi$ cycle.

As noted above, the frequency independent phase variable X is included in each of the three parameters to take into account frequency-independent delays that may be caused by noise and/or various aspects of the satellite's structure and/or environment. The value of the frequency independent phase variable X is the same for each of the three parameters.

Once the squares of the phase differences are computed, the process 700 selects the minimum of the computed phase differences and stores the minimum as a function $G_{ijk}(D,X,i)$ (712). Notably, each of the three different phase difference parameters is a function of the frequency-independent phase variable X. However, since the value of the phase variable X is the same for each of the three different parameters, it is possible to identify which of the three different parameters will yield a minimum value, irrespective of the value of X.

In one implementation example, the return link processor 440 may compute the minimum phase difference $G_{ijk}(D,X,i)$ using the equation:

$$G_{ijk}(D,X,i)=\min\{(P_{ijk}-2\pi Df_i-X)^2, (2\pi+P_{ijk}-2\pi Df_i-X)^2, (-2\pi+P_{ijk}-2\pi Df_i-X)^2\} \tag{3}$$

In equation (3), $2\pi Df_i$ is the estimated phase at frequency $f_i$ due to delay D. In some respects, calculation of $G_{ijk}(D,X,i)$ enables the repetition of phase every $2\pi$ cycles to be removed from the error calculations.

Subsequent to computing the minimum phase difference $G_{ijk}(D,X,i)$ for the selected frequency $f_i$ and candidate delay D, a determination is made whether all calibration signal frequencies have been considered (714). If all of the calibration signal frequencies have not been considered, then the process 700 selects a new frequency $f_i$ (706) and performs operations 708 through 712 to determine a corresponding minimum phase difference $G_{ijk}(D,X,i)$ for the same candidate delay D, the same feed j and the same dish k but now for signals that are transmitted using the new frequency $f_i$.

Once all of the calibration signal frequencies have been considered, the process 700 determines an error function $M_{jk}(D,X)$ as a sum of the minimum phase errors at all frequencies $f_i$ (716). For example, the return link processor 440 may compute the error function $M_{jk}(D,X)$ as a sum of $G_{ijk}(D,X,i)$ over all of the calibration signal frequencies, using the equation:

$$M_{jk}(D,X)=\Sigma_i G_{ijk}(D,X,i) \qquad (4)$$

As shown in equation (4), the error function $M_{jk}(D,X)$ is computed by summing the minimum phase differences $G_{ijk}(D,X,i)$ for all of the frequencies $f_i$. The error function $M_{jk}(D,X)$ is specific to a candidate delay D and depends on a given X for a feed j on reflecting dish k.

In one implementation example, two calibration signal frequencies $f_1$ and $f_2$ are used to calibrate a satellite that includes 60 feeds that are designated by j=1 to 60 and 2 reflecting dishes that are designated by k=1 and 2. The feeds designated by j=1 to 30 receive signals that are reflected by dish 1, and the feeds designated by j=31 to 60 receive signals that are reflected by dish 2. For the feed designated by j=1 and for the selected candidate delay D, execution of operations 704 through 716 yields an error function $M_{11}(D, X)=G_{111}(D,X,1)+G_{211}(D,X,2)$. Notably, since D is a constant value, the error function M(D,X) is only a function of the frequency-independent phase variable X.

The error function $M_{jk}(D,X)$ corresponding to candidate delay D, which is a function of the frequency-independent phase variable X, is then minimized over all values of X between 0 and $2\pi$ to arrive at a minimum error value $Y_{jk}(D)$ for the candidate delay D (717). Minimizing the error function $M_{jk}(D,X)$ over all values of X may be done by convex optimization.

After determining the minimum error value $Y_{jk}(D)$ for the candidate delay D, the process 700 checks whether all candidate delay values have been considered (718). If all candidate delay values have not been considered, then the process 700 selects a new candidate delay value $D_{new}$ in accordance with the search algorithm used to traverse the search space for the return link delay $DR_{jk}$ (704) and computes a corresponding new minimum error value $Y_{jk}(D_{new})$ by performing operations 706 through 717 for the new candidate delay value $D_{new}$.

Once all candidate delays have been considered, the process 700 selects the candidate delay D corresponding to the smallest of all of the calculated minimum error values $Y_{jk}(D)$ as the return link delay $DR_{jk}$ (720). For example, the return link processor 440 may access all of the calculated minimum error values $Y_{jk}(D)$ for all candidate delays D, identify which of the calculated minimum error values $Y_{jk}(D)$ is the smallest, and then designate the corresponding delay D for that smallest $Y_{jk}(D)$ error value as the return link delay $DR_{jk}$.

As described previously, the return link $DR_{jk}$ may be used to compute the forward link delay $DF_{jk}$ for the feed j on reflecting dish k. $DR_{jk}$ and $DF_{jk}$ for all feeds j on reflecting dish k, along with the calculated pointing error for reflecting dish k, are used to calculate phase and gain beamforming coefficients for all feeds j on reflecting dish k. In one implementation, unadjusted phase and gain beamforming coefficients that achieve a desired beam pattern are accessed by performing a look up using tables. Prior to applying the beamforming coefficients to signals, however, the phases and gains of the accessed beamforming coefficients are modified by the calculated delays $DR_{jk}$ and $DF_{jk}$ and to correct the calculated pointing errors. This modification of the accessed beamforming coefficients enables the desired beam pattern to be achieved despite the movement of the reflecting dishes.

The calibration processes 600 and 700 may be performed for all reflecting dishes and all feeds to enable beamforming to occur over all feeds for signals reflected by all of the reflecting dishes. By using the calibration processes 600 and 700, feed signals reflected by multiple different reflecting dishes may be combined together to form a single spot beam and/or contiguous beam coverage area. For example, peak beams may be formed by coherently combining signals reflected by multiple different reflecting dishes when the beamforming coefficients have been calibrated using the calibration processes 600 and 700 to ensure that the reflected signals coherently combine.

After deployment in its prescribed orbital location, the satellite 105 may have a particular field of view corresponding to the deployed orientation of its reflecting apertures or dishes. As noted previously, the satellite 105's ability to create beams is generally limited to creation of beams within this particular field of view. After deployment, the satellite 105 may then receive and process calibration signals that are periodically or continuously transmitted by CESs on Earth and may use these signals to determine feed delays and dish (or, more generally, aperture) pointing errors in the manner described previously. The feed delays and the dish pointing errors may then be used to calibrate the beamforming coefficients to thereby enable feed signals reflected from two or more dishes to be coherently combined to form beams within the particular field of view, despite the relative movement or vibration that exists between the two or more dishes. For example, the feed delays and the dish pointing errors may be used to enable generation of a single beam (e.g., a spot beam) by coherently combining a group of feed signals that includes at least one signal reflected from or redirected by a first reflecting aperture or dish and at least one signal reflected or redirected by a second and different reflecting aperture.

In some implementations, a communication service provider, however, may subsequently desire a communication service coverage area that falls outside of the particular field of view of the satellite 105 corresponding to the deployed orientation of its reflecting apertures or dishes. In a typical reflecting satellite communication system, the communication service provider would be unable to provide communication services over an area that falls outside of the particular field of view of the satellite 105 corresponding to the deployed orientation. However, the satellite system 100, unlike typical reflecting satellite communication systems, may dynamically adjust the field of view of the satellite 105 to encompass the desired communication service coverage area by changing the orientation of its reflecting apertures or dishes after deployment, thereby allowing beams to be formed within the desired service coverage area. For example, a gateway or a CES may subsequently send a signal to the satellite 105 that causes the satellite 105 to change the orientation of its reflecting apertures or dishes from the deployed orientation to a new orientation that corresponds to a new field of view encompassing the desired communication service coverage area. For example, the signal may be processed by the processor 440 or by another processor within the satellite 105, and, as a result of the processing, the processor 440 or other processor may transmit signals to or otherwise communicate with one, some or all of the gimbals of the reflecting dishes of the satellite 105 to cause the gimbals to change the orientation of their respective dishes and thereby arrive at the new orientation corresponding to the new field of view. After its reflecting apertures are positioned at the new orientation, the satellite 105 may again calculate feed delays and the dish pointing errors and use the feed delays and dish pointing errors to calibrate the beamforming coefficients used to form beams within the new field of view of the satellite 105.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method for satellite beamforming, the method comprising:
determining, using a computer processor, a first delay associated with a first signal exchanged between a satellite and an Earth station, the first signal redirected by a first reflecting structure on the satellite and the first delay resulting from motion of the first reflecting structure relative to the satellite;
determining a second delay associated with a second signal exchanged between the satellite and the Earth station, the second signal redirected by a second reflecting structure on the satellite and the second delay resulting from motion of the second reflecting structure relative to the satellite, the second delay being different from the first delay; and
calculating, using the first delay and the second delay, satellite beamforming coefficients that enable generation of a single beam by combining a group of signals that includes the first signal and the second signal.

2. The method of claim 1, wherein the first signal is associated with a first antenna element on the satellite, the first reflecting structure redirecting a path of the first signal between the first antenna element and the Earth station, and
wherein the second signal is associated with a second antenna element on the satellite, the second reflecting structure redirecting a path of the second signal between the second antenna element and the Earth station.

3. The method of claim 2, wherein determining the first delay comprises:
periodically receiving, at the first antenna element, calibration signals transmitted by the Earth station and redirected to the first antenna element by the first reflecting structure; and
determining the first delay based on the calibration signals.

4. The method of claim 2, wherein determining the first delay comprises:
periodically receiving, at the first antenna element, calibration signals corresponding to a plurality of frequencies transmitted by the Earth station and redirected to the first antenna element by the first reflecting structure;
measuring a phase of each of the calibration signals; and
determining the first delay based on the measured phases.

5. The method of claim 4, wherein determining the first delay based on the measured phases comprises:

determining a calibration error function based on the measured phases;

identifying a minimum value of the calibration error function; and determining a value of the first delay corresponding to the minimum value of the calibration error function.

6. The method of claim 4, wherein determining the first delay based on the measured phases comprises:

selecting a candidate delay from a known group of link delays associated with the first antenna element;

computing phase differences between the measured phases and a phase corresponding to the candidate delay;

selecting a minimum of the phase differences associated with the candidate delay for each frequency; and computing an error function associated with the candidate delay as a sum of the minimum phase differences for the plurality of frequencies.

7. The method of claim 1, further comprising:

determining a first pointing error corresponding to the first reflecting structure, the first pointing error representing a divergence of an actual pointing direction of the first reflecting structure from an estimated pointing direction of the first reflecting structure; and determining a second pointing error corresponding to the second reflecting structure, the second pointing error representing a divergence of an actual pointing direction of the second reflecting structure from an estimated pointing direction of the second reflecting structure.

8. The method of claim 7, wherein calculating the satellite beamforming coefficients comprises calculating the satellite beamforming coefficients using the first delay, the second delay, the first pointing error, and the second pointing error.

9. A spacecraft comprising:

a first reflecting structure and a second reflecting structure; and one or more processors that are configured to:

determine a first delay associated with a first signal exchanged between the spacecraft and an Earth station, the first signal redirected by the first reflecting structure and the first delay resulting from motion of the first reflecting structure relative to the spacecraft;

determine a second delay associated with a second signal exchanged between the spacecraft and the Earth station, the second signal redirected by a second reflecting structure on the spacecraft and the second delay resulting from motion of the second reflecting structure relative to the spacecraft, the second delay being different from the first delay; and calculate, using the first delay and the second delay, beamforming coefficients that enable generation of a single beam by combining a group of signals that includes the first signal and the second signal.

10. The spacecraft of claim 9, further comprising a first antenna element and a second antenna element, wherein the first signal is associated with the first antenna element, the first reflecting structure redirecting a path of the first signal between the first antenna element and the Earth station, and wherein the second signal is associated with the second antenna element, the second reflecting structure redirecting a path of the second signal between the second antenna element and the Earth station.

11. The spacecraft of claim 10, wherein determining the first delay comprises:

periodically receiving, at the first antenna element, calibration signals transmitted by the Earth station and redirected to the first antenna element by the first reflecting structure; and determining the first delay based on the calibration signals.

12. The spacecraft of claim 10, wherein determining the first delay comprises:

periodically receiving, at the first antenna element, calibration signals corresponding to a plurality of frequencies transmitted by the Earth station and redirected to the first antenna element by the first reflecting structure;

measuring a phase of each of the calibration signals; and determining the first delay based on the measured phases.

13. The spacecraft of claim 12, wherein determining the first delay based on the measured phases comprises:

determining a calibration error function based on the measured phases;

identifying a minimum value of the calibration error function; and determining a value of the first delay corresponding to the minimum value of the calibration error function.

14. The spacecraft of claim 12, wherein determining the first delay based on the measured phases comprises:

selecting a candidate delay from a known group of link delays associated with the first antenna element;

computing phase differences between the measured phases and a phase corresponding to the candidate delay;

selecting a minimum of the phase differences associated with the candidate delay for each frequency; and computing an error function associated with the candidate delay as a sum of the minimum phase differences for the plurality of frequencies.

15. The spacecraft of claim 9, further comprising:

determining a first pointing error corresponding to the first reflecting structure, the first pointing error representing a divergence of an actual pointing direction of the first reflecting structure from an estimated pointing direction of the first reflecting structure; and determining a second pointing error corresponding to the second reflecting structure, the second pointing error representing a divergence of an actual pointing direction of the second reflecting structure from an estimated pointing direction of the second reflecting structure.

16. The spacecraft of claim 15, wherein calculating the beamforming coefficients comprises calculating the beamforming coefficients using the first delay, the second delay, the first pointing error, and the second pointing error.

17. A non-transitory computer-readable medium storing instructions that, when executed by one or more processors, are configured to cause the one or more processors to perform operations comprising:

determining a first delay associated with a first signal exchanged between a satellite and an Earth station, the first signal redirected by a first reflecting structure on the satellite and the first delay resulting from motion of the first reflecting structure relative to the satellite;

determining a second delay associated with a second signal exchanged between the satellite and the Earth station, the second signal redirected by a second reflecting structure on the satellite and the second delay resulting from motion of the second reflecting structure relative to the satellite, the second delay being different from the first delay; and calculating, using the first delay and the second delay, satellite beamforming coefficients that enable generation of a single beam by combining a group of signals that includes the first signal and the second signal.

18. The non-transitory computer-readable medium of claim 17, wherein the first signal is associated with a first antenna element on the satellite, the first reflecting structure redirecting a path of the first signal between the first antenna element and the Earth station, and
 wherein the second signal is associated with a second antenna element on the satellite, the second reflecting structure redirecting a path of the second signal between the second antenna element and the Earth station.

19. The non-transitory computer-readable medium of claim 18, wherein determining the first delay comprises:
 periodically receiving, at the first antenna element, calibration signals transmitted by the Earth station and redirected to the first antenna element by the first reflecting structure; and
 determining the first delay based on the calibration signals.

20. The non-transitory computer-readable medium of claim 18, wherein determining the first delay comprises:
 periodically receiving, at the first antenna element, calibration signals corresponding to a plurality of frequencies transmitted by the Earth station and redirected to the first antenna element by the first reflecting structure;
 measuring a phase of each of the calibration signals; and
 determining the first delay based on the measured phases.

21. The non-transitory computer-readable medium of claim 20, wherein determining the first delay based on the measured phases comprises:
 determining a calibration error function based on the measured phases;
 identifying a minimum value of the calibration error function; and
 determining a value of the first delay corresponding to the minimum value of the calibration error function.

22. The non-transitory computer-readable medium of claim 17, wherein the operations further comprise:
 determining a first pointing error corresponding to the first reflecting structure, the first pointing error representing a divergence of an actual pointing direction of the first reflecting structure from an estimated pointing direction of the first reflecting structure; and
 determining a second pointing error corresponding to the second reflecting structure, the second pointing error representing a divergence of an actual pointing direction of the second reflecting structure from an estimated pointing direction of the second reflecting structure.

23. The non-transitory computer-readable medium of claim 22, wherein calculating the satellite beamforming coefficients comprises calculating the satellite beamforming coefficients using the first delay, the second delay, the first pointing error, and the second pointing error.

24. A method for satellite beamforming, the method comprising:
 determining, using a computer processor, first satellite beamforming coefficients that enable generation of a first beam by using a first signal exchanged between a satellite and an Earth station, wherein the first signal is associated with a first antenna element on the satellite and wherein a first reflecting structure on the satellite redirects a path of the first signal between the first antenna element and the Earth station;
 determining second satellite beamforming coefficients that enable generation of a second beam using a second signal exchanged between the satellite and the Earth station, wherein the second signal is associated with a second antenna element on the satellite and wherein a second reflecting structure on the satellite redirects a path of the second signal between the second antenna element and the Earth station,
 wherein an orientation of the first reflecting structure can be manipulated without manipulating an orientation of the second reflecting structure, and the orientation of the second reflecting structure can be manipulated without manipulating the orientation of the first reflecting structure.

25. The method of claim 24, wherein determining the first satellite beamforming coefficients comprises:
 determining, using the computer processor, a first delay associated with the first signal, the first delay resulting from motion of the first reflecting structure relative to the satellite; and
 calculating the first satellite beamforming coefficients using the first delay.

26. The method of claim 25, wherein determining the first delay comprises:
 periodically receiving, at the first antenna element, calibration signals transmitted by the Earth station and redirected to the first antenna element by the first reflecting structure;
 measuring a phase of each of the calibration signals; and
 determining the first delay based on the measured phases.

27. The method of claim 26, wherein determining the first delay based on the measured phases comprises:
 determining a calibration error function based on the measured phases;
 identifying a minimum value of the calibration error function; and
 determining a value of the first delay corresponding to the minimum value of the calibration error function.

28. The method of claim 26, wherein determining the first delay based on the measured phases comprises:
 selecting a candidate delay from a known group of link delays associated with the first antenna element;
 computing phase differences between the measured phases and a phase corresponding to the candidate delay;
 selecting a minimum of the phase differences associated with the candidate delay for each frequency; and
 computing an error function associated with the candidate delay as a sum of the minimum phase differences for the plurality of frequencies.

29. The method of claim 25, further comprising:
 determining a first pointing error corresponding to the first reflecting structure, the first pointing error representing a divergence of an actual pointing direction of the first reflecting structure from an estimated pointing direction of the first reflecting structure, and
 wherein calculating the first satellite beamforming coefficients comprises calculating the first satellite beamforming coefficients using the first delay and the first pointing error.

30. The method of claim 24, wherein determining the second satellite beamforming coefficients comprises:
 determining, using the computer processor, a second delay associated with the second signal, the second delay resulting from motion of the second reflecting structure relative to the satellite; and
 calculating the second satellite beamforming coefficients using the second delay.

31. The method of claim 30, wherein determining the second delay comprises:

periodically receiving, at the second antenna element, calibration signals corresponding to a plurality of frequencies transmitted by the Earth station and redirected to the second antenna element by the second reflecting structure;

measuring a phase of each of the calibration signals; and determining the second delay based on the measured phases.

32. The method of claim 31, wherein determining the second delay based on the measured phases comprises:

determining a calibration error function based on the measured phases;

identifying a minimum value of the calibration error function; and determining a value of the second delay corresponding to the minimum value of the calibration error function.

33. The method of claim 31, wherein determining the second delay based on the measured phases comprises:

selecting a candidate delay from a known group of link delays associated with the second antenna element;

computing phase differences between the measured phases and a phase corresponding to the candidate delay;

selecting a minimum of the phase differences associated with the candidate delay for each frequency; and computing an error function associated with the candidate delay as a sum of the minimum phase differences for the plurality of frequencies.

34. The method of claim 30, further comprising:

determining a second pointing error corresponding to the second reflecting structure, the second pointing error representing a divergence of an actual pointing direction of the second reflecting structure from an estimated pointing direction of the second reflecting structure, and wherein calculating the second satellite beamforming coefficients comprises calculating the satellite beamforming coefficients using the second delay and the second pointing error.

35. The method of claim 24, wherein manipulating the orientation of the first reflecting structure without manipulating the orientation of the second reflecting structure comprises steering the first reflecting structure independently of the second reflecting structure.

36. The method of claim 24, wherein the first reflecting structure includes a first reflecting dish and the second reflecting structure includes a second reflecting dish.

37. A spacecraft comprising:

a first reflecting structure and a second reflecting structure; and one or more processors that are configured to:

determine first spacecraft beamforming coefficients that enable generation of a first beam by using a first signal exchanged between the spacecraft and an Earth station, wherein the first signal is associated with a first antenna element on the spacecraft and wherein the first reflecting structure on the spacecraft redirects a path of the first signal between the first antenna element and the Earth station;

determine second spacecraft beamforming coefficients that enable generation of a second beam using a second signal exchanged between the spacecraft and the Earth station, wherein the second signal is associated with a second antenna element on the spacecraft and wherein the second reflecting structure on the spacecraft redirects a path of the second signal between the second antenna element and the Earth station, wherein an orientation of the first reflecting structure can be manipulated without manipulating an orientation of the second reflecting structure, and the orientation of the second reflecting structure can be manipulated without manipulating the orientation of the first reflecting structure.

38. The spacecraft of claim 37, wherein determining the first spacecraft beamforming coefficients comprises:

determining a first delay associated with the first signal, the first delay resulting from motion of the first reflecting structure relative to the spacecraft; and calculating the first spacecraft beamforming coefficients using the first delay.

39. The spacecraft of claim 38, wherein determining the first delay comprises:

periodically receiving, at the first antenna element, calibration signals transmitted by the Earth station and redirected to the first antenna element by the first reflecting structure;

measuring a phase of each of the calibration signals; and determining the first delay based on the measured phases.

40. The spacecraft of claim 39, wherein determining the first delay based on the measured phases comprises:

determining a calibration error function based on the measured phases;

identifying a minimum value of the calibration error function; and determining a value of the first delay corresponding to the minimum value of the calibration error function.

41. The spacecraft of claim 39, wherein determining the first delay based on the measured phases comprises:

selecting a candidate delay from a known group of link delays associated with the first antenna element;

computing phase differences between the measured phases and a phase corresponding to the candidate delay;

selecting a minimum of the phase differences associated with the candidate delay for each frequency; and computing an error function associated with the candidate delay as a sum of the minimum phase differences for the plurality of frequencies.

42. The spacecraft of claim 38, wherein the one or more processors are further configured to:

determine a first pointing error corresponding to the first reflecting structure, the first pointing error representing a divergence of an actual pointing direction of the first reflecting structure from an estimated pointing direction of the first reflecting structure, and wherein calculating the first spacecraft beamforming coefficients comprises calculating the first spacecraft beamforming coefficients using the first delay and the first pointing error.

43. The spacecraft of claim 37, wherein determining the second spacecraft beamforming coefficients comprises:

determining a second delay associated with the second signal, the second delay resulting from motion of the second reflecting structure relative to the spacecraft; and calculating the second spacecraft beamforming coefficients using the second delay.

44. The spacecraft of claim 43, wherein determining the second delay comprises:

periodically receiving, at the second antenna element, calibration signals corresponding to a plurality of frequencies transmitted by the Earth station and redirected to the second antenna element by the second reflecting structure;

measuring a phase of each of the calibration signals; and
determining the second delay based on the measured phases.

45. The spacecraft of claim 44, wherein determining the second delay based on the measured phases comprises:
determining a calibration error function based on the measured phases;
identifying a minimum value of the calibration error function; and
determining a value of the second delay corresponding to the minimum value of the calibration error function.

46. The spacecraft of claim 44, wherein determining the second delay based on the measured phases comprises:
selecting a candidate delay from a known group of link delays associated with the second antenna element;
computing phase differences between the measured phases and a phase corresponding to the candidate delay;
selecting a minimum of the phase differences associated with the candidate delay for each frequency; and
computing an error function associated with the candidate delay as a sum of the minimum phase differences for the plurality of frequencies.

47. The spacecraft of claim 43, wherein the one or more processors are further configured to:
determine a second pointing error corresponding to the second reflecting structure, the second pointing error representing a divergence of an actual pointing direction of the second reflecting structure from an estimated pointing direction of the second reflecting structure, and
wherein calculating the second spacecraft beamforming coefficients comprises calculating the spacecraft beamforming coefficients using the second delay and the second pointing error.

48. The spacecraft of claim 37, wherein manipulating the orientation of the first reflecting structure without manipulating the orientation of the second reflecting structure comprises steering the first reflecting structure independently of the second reflecting structure.

49. The spacecraft of claim 37, wherein the first reflecting structure includes a first reflecting dish and the second reflecting structure includes a second reflecting dish.

* * * * *

UNITED STATES PATENT AND TRADEMARK OFFICE
CERTIFICATE OF CORRECTION

PATENT NO. : 9,991,587 B1
APPLICATION NO. : 15/269526
DATED : June 5, 2018
INVENTOR(S) : Jeffrey Freedman et al.

Page 1 of 1

It is certified that error appears in the above-identified patent and that said Letters Patent is hereby corrected as shown below:

On the Title Page

Column 1, Name of Assignee: (73), Line 1, delete "RFK" and insert -- RKF --, therefor.

Column 1, (Notice:), Line 3, delete "0 days. days." and insert -- 0 days. --, therefor.

Signed and Sealed this
Fourth Day of September, 2018

Andrei Iancu
*Director of the United States Patent and Trademark Office*